(12) United States Patent
Ryu

(10) Patent No.: US 10,717,422 B2
(45) Date of Patent: Jul. 21, 2020

(54) VEHICLE CONTROL APPARATUS AND CONTROL METHOD THEREOF

(71) Applicant: MANDO CORPORATION, Pyeongtaek-si, Gyeonggi-do (KR)

(72) Inventor: Kwang-Hyun Ryu, Hanam-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 203 days.

(21) Appl. No.: 15/903,898

(22) Filed: Feb. 23, 2018

(65) Prior Publication Data

US 2018/0244248 A1 Aug. 30, 2018

(30) Foreign Application Priority Data

Feb. 24, 2017 (KR) .................. 10-2017-0024932

(51) Int. Cl.
| | |
|---|---|
| *B60T 8/17* | (2006.01) |
| *B60T 13/74* | (2006.01) |
| *B60T 13/66* | (2006.01) |
| *B60T 7/12* | (2006.01) |
| *B60T 8/58* | (2006.01) |

(Continued)

(52) U.S. Cl.
CPC ............. *B60T 8/1763* (2013.01); *B60T 7/12* (2013.01); *B60T 8/1761* (2013.01); *B60T 8/17636* (2013.01); *B60T 8/58* (2013.01); *B60T 13/662* (2013.01); *B60T 13/74* (2013.01); *B60T 13/741* (2013.01); *B60T 2201/10* (2013.01); *B60T 2210/12* (2013.01); *B60T 2210/124* (2013.01); *B60T 2240/02* (2013.01)

(58) Field of Classification Search
CPC .. B60T 8/1763; B60T 8/17636; B60T 13/662; B60T 13/74; B60T 13/741; B60T 8/58; B60T 8/1761; B60T 7/12; B60T 2210/124; B60T 2201/10; B60T 2240/02; B60T 2210/12; B60T 8/176; B60T 8/172
See application file for complete search history.

(56) References Cited

U.S. PATENT DOCUMENTS 5,852,330 A * 12/1998 Yumoto ................. B60K 28/16
290/40 R
6,220,985 B1 * 4/2001 Okahara ............ F16H 61/66259
477/46

FOREIGN PATENT DOCUMENTS

| KR | 10-1417770 B1 | 7/2014 |
|---|---|---|
| KR | 10-2016-0053405 A | 5/2016 |

* cited by examiner

*Primary Examiner* — Rodney A Butler
(74) *Attorney, Agent, or Firm* — Morgan, Lewis & Bockius LLP

(57) ABSTRACT

The vehicle control apparatus and the control method thereof include an electronic control unit configured to receive wheel slip values sensed by a sensing apparatus, receive the wheel slip values and calculate a predicted wheel slip value using slip prediction model information on the basis of a previous wheel slip value and a current wheel slip value among the wheel slip values. Whether a current state is a first state of which a vehicle moved from a high friction road to a low friction road on the basis of the calculated predicted wheel slip value is then determined. The calculated predicted wheel slip value is compared with predicted target slip value ranges when the current state is determined as being the first state. Whether to control an electric parking brake (EPB) apparatus is determined. A controller configured to transmit a command based on the determination by the ECU.

16 Claims, 14 Drawing Sheets

(51) Int. Cl.
*B60T 8/1763* (2006.01)
*B60T 8/1761* (2006.01)

(a) VEHICLE SPEED VALUE USING CONVENTIONAL SLIP INFORMATION (b) VEHICLE SPEED VALUE USING SLIP PREDICTION MODEL
INFORMATION OF PRESENT DISCLOSURE

VEHICLE CONTROL APPARATUS AND CONTROL METHOD THEREOF

CROSS-REFERENCE TO RELATED APPLICATION

This application is based on and claims priority under 35 U.S.C. § 119 to Korean Patent Application No. 10-2017-0024932, filed on Feb. 24, 2017, in the Korean Intellectual Property Office, the disclosure of which is incorporated by reference herein in its entirety.

BACKGROUND

1. Field

The present disclosure relates to a vehicle control apparatus and a control method thereof.

2. Description of the Related Art

Generally, a conventional service brake apparatus operates to stop a vehicle which is traveling.

At this point, when wheel slip occurs, an anti-lock brake system (ABS) operates to prevent a vehicle from slipping and, simultaneously, to increase a braking force.

Meanwhile, a conventional electric parking brake (EPB) apparatus operates to stop the vehicle which is traveling when the service brake apparatus is unable to operate.

However, an electric parking brake control method using the conventional electric parking brake apparatus has limitations in minimizing wheel slip while maximizing deceleration of the vehicle.

Therefore, in recent years, research has been ongoing for an improved vehicle control apparatus and an improved control method thereof so as to minimize wheel slip while maximizing deceleration of a vehicle.

PRIOR ART DOCUMENT

Patent Document

Korean Patent Application Publication No. 10-2016-0053405 (May 13, 2016)

SUMMARY

In accordance with one aspect of the present disclosure, there is provided a vehicle control apparatus and a control method thereof which are capable of minimizing wheel slip while maximizing deceleration of a vehicle.

In accordance with another aspect of the present disclosure, there is provided a vehicle control apparatus and a control method thereof which are capable of guiding a cautious driving of a driver while relieving driver anxiety experienced with respect to a current state of the vehicle.

Additional aspects of the present disclosure will be set forth in part in the description which follows and, in part, will be obvious from the description, or may be learned by practice of the disclosure.

In accordance with one aspect of the present disclosure, a vehicle control apparatus includes an inputter configured to receive wheel slip values sensed by a sensing apparatus; a calculator configured to receive the wheel slip values and calculate a predicted wheel slip value using slip prediction model information on the basis of a previous wheel slip value and a current wheel slip value among the wheel slip values; a determiner configured to determine whether a current state is a first state in which a vehicle moved from a high friction road to a low friction road on the basis of the calculated predicted wheel slip value, compare the calculated predicted wheel slip value with predicted target slip value ranges when the current state is determined as being the first state, and determine whether to control an electric parking brake (EPB) apparatus of which one state among an apply state, a stop state, and a release state; and a controller configured to transmit at least one command among an apply command corresponding to the apply state, a stop command corresponding to the stop state, and a release command corresponding to the release state to the EPB apparatus when the current state is determined as being the first state.

The determiner may determine whether the current state is a second state in which the calculated predicted wheel slip value is less than a first predicted target slip value range of the predicted target slip value ranges.

The determiner may determine whether the current state is a third state in which the calculated predicted wheel slip value is greater than a first predicted target slip value range of the predicted target slip value ranges and is less than a second predicted target slip value range thereof.

The determiner may determine whether the current state is a fourth state in which the calculated predicted wheel slip value is greater than a second predicted target slip value range of the predicted target slip value ranges.

When the current state is determined as being the first state and a second state in which the calculated predicted wheel slip value is less than a first predicted target slip value range of the predicted target slip value ranges, the controller may transmit the apply command corresponding to the apply state to the EPB apparatus.

When the current state is determined as being the first state and a third state in which the calculated predicted wheel slip value is greater than a first predicted target slip value range of the predicted target slip value ranges and is less than a second predicted target slip value range thereof, the controller may transmit the stop command corresponding to the stop state to the EPB apparatus.

When the current state is determined as being the first state and a fourth state in which the calculated predicted wheel slip value is greater than a second predicted target slip value range of the predicted target slip value ranges, the controller may transmit the release command corresponding to the release state to the EPB apparatus.

The inputter may further receive a vehicle speed value sensed by the sensing apparatus; the determiner may further determine whether the vehicle is in the stop state on the basis of the received vehicle speed value; and the controller may receive the vehicle speed value and further transmits an OFF command to the EPB apparatus to turn off the EPB apparatus when the vehicle is determined as being in the stop state.

In accordance with another aspect of the present disclosure, a vehicle control method includes a first input operation of receiving wheel slip values sensed by a sensing apparatus; a calculation operation of receiving the wheel slip values and calculating a predicted wheel slip value using slip prediction model information on the basis of a previous wheel slip value and a current wheel slip value among the wheel slip values; a first determination operation of determining whether a current state is a first state in which a vehicle moved from a high friction road to a low friction road on the basis of the calculated predicted wheel slip value; a second determination operation of comparing the calculated predicted wheel slip value with predicted target slip value ranges when the current state is determined as being the first state, and determining whether to control an electric parking brake (EPB) apparatus of which one state among an apply state, a stop state, and a release state; and a first control operation of transmitting at least one command among an apply command corresponding to the apply state, a stop command corresponding to the stop state, and a release command corresponding to the release state to the EPB apparatus when the current state is determined as being the first state.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
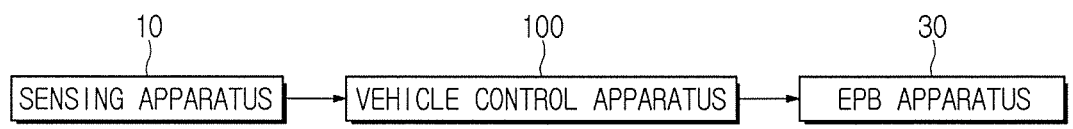
FIG. 1 is a block configuration diagram illustrating a state in which a vehicle control apparatus according to one embodiment of the present disclosure is connected to a sensing apparatus and an electric parking brake (EPB) apparatus.

Hereinafter, embodiments of the present disclosure will be described in detail with reference to the accompanying drawings. The embodiments to be described below are provided to fully convey the spirit of the present disclosure to those skilled in the art. The present disclosure is not limited to the embodiments disclosed herein and may be implemented in other forms. In the drawings, some portions not related to the description will be omitted and not be shown to clearly describe the present disclosure, and sizes of components may be somewhat exaggerated to facilitate understanding.

Figure 2:
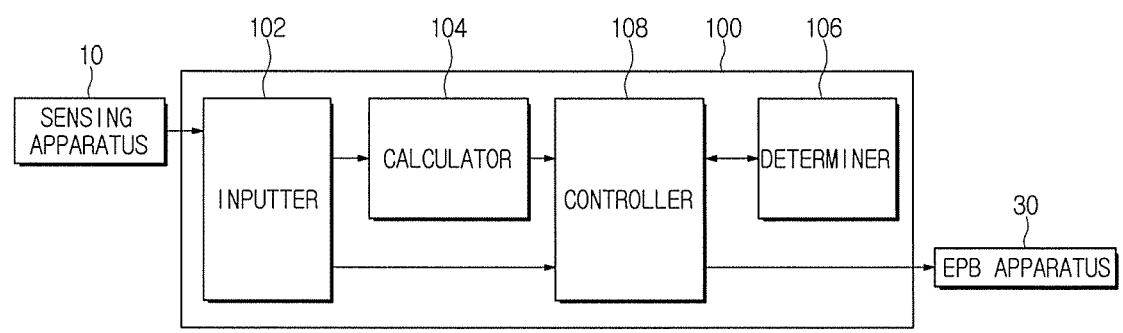
FIG. 2 is a block configuration diagram illustrating one example of the vehicle control apparatus shown in FIG. 1.

FIG. 1 is a block configuration diagram illustrating a state in which a vehicle control apparatus according to one embodiment of the present disclosure is connected to a sensing apparatus and an electric parking brake (EPB) apparatus, and FIG. 2 is a block configuration diagram illustrating one example of the vehicle control apparatus shown in FIG. 1.

Figure 3:
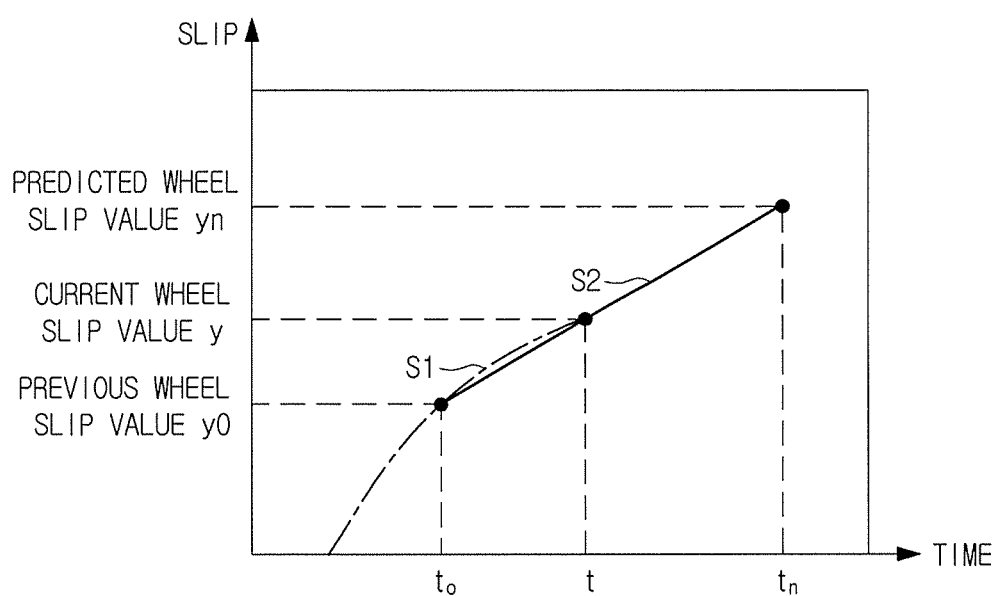
FIG. 3 is a graph illustrating a process of calculating, in a calculator shown in FIG. 2, a predicted wheel slip value using slip prediction model information on the basis of a previous wheel slip value and a current wheel slip value among wheel slip values.

FIG. 3 is a graph illustrating a process of calculating, in a calculator shown in FIG. 2, a predicted wheel slip value using slip prediction model information on the basis of a previous wheel slip value and a current wheel slip value among wheel slip values.

Figure 4:
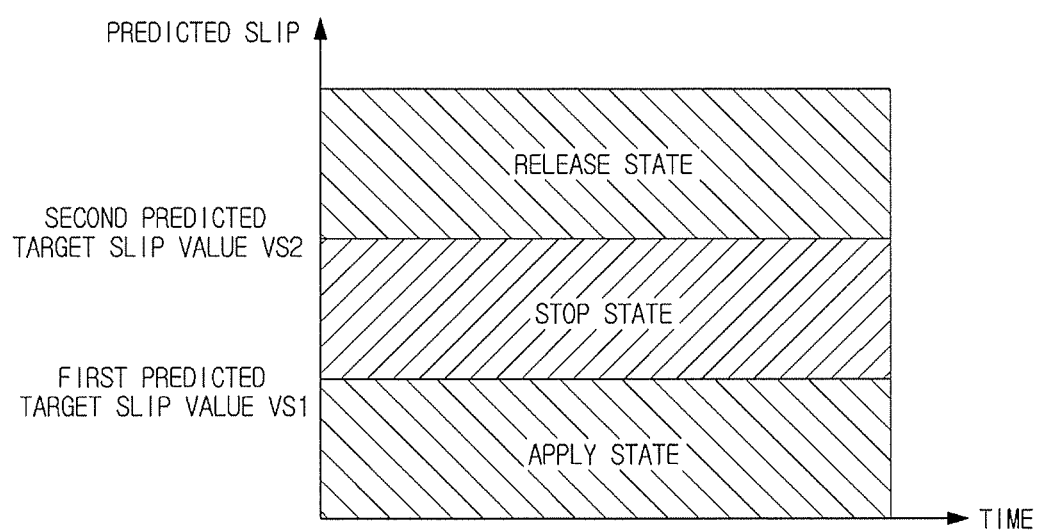
FIG. 4 is a graph illustrating a process of controlling, in a controller shown in FIG. 2, the EPB apparatus in an apply state, a stop state, and a release state according to a determination result of a determiner.

FIG. 4 is a graph illustrating a process of controlling, in a controller shown in FIG. 2, the EPB apparatus in an apply state, a stop state, and a release state according to a determination result of a determiner.

Figure 5:
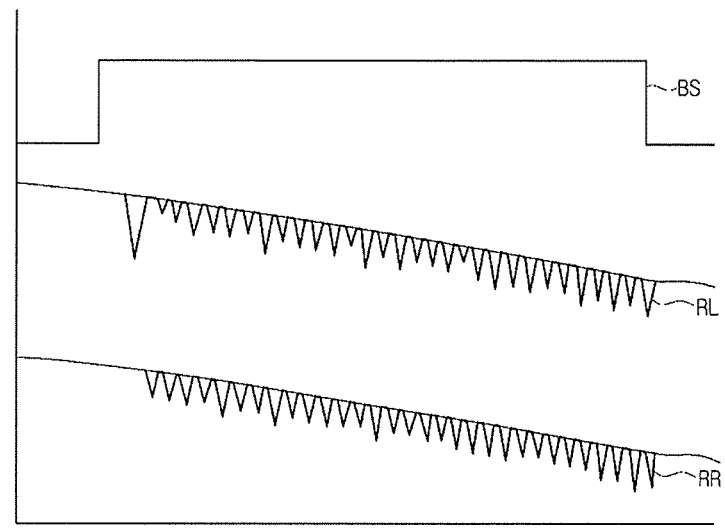
FIG. 5 is a graph illustrating a comparison of a vehicle speed value using slip prediction model information of the present disclosure with a vehicle speed value using conventional slip information when a brake signal is applied to the EPB apparatus shown in FIG. 2.
Figure 5:
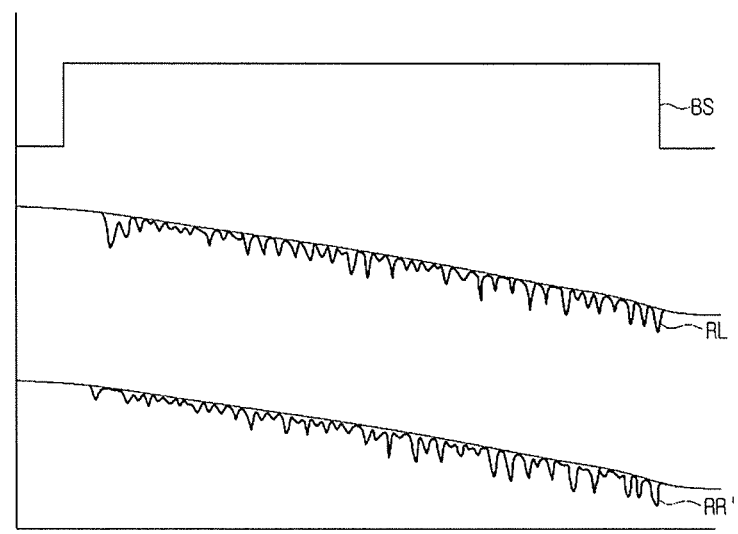

FIG. 5 is a graph illustrating a comparison of a vehicle speed value using slip prediction model information of the present disclosure with a vehicle speed value using conventional slip information when a brake signal is applied to the EPB apparatus shown in FIG. 2.

Referring to FIGS. 1 and 2, a vehicle control apparatus 100 according to one embodiment of the present disclosure includes an inputter 102, a calculator 104, a determiner 106, and a controller 108.

The inputter 102 receives wheel slip values sensed by a sensing apparatus 10.

At this point, although not shown in the drawings, the sensing apparatus 10 may include a wheel slip sensing sensor (not shown) configured to sense wheel slip values.

As shown in FIGS. 2 and 3, the calculator 104 receives the wheel slip values input to the inputter 102 and calculates a predicted wheel slip value (yn) using slip prediction model information on the basis of a previous wheel slip value (y0) and a current wheel slip value (y) among the wheel slip values.

For example, as shown in FIGS. 2 and 3, the calculator 104 may calculate the previous wheel slip value (y0) and the current wheel slip value (y) during a certain period of time S1 (from a time t0 to a time t), and calculate the predicted wheel slip value (yn) on the basis of the previous wheel slip value (y0) and the current wheel slip value (y) during an upcoming period of time S2 (from the time t to a time tn).

The determiner 106 determines, under the control of the controller 108 which will be described below, whether a current state is a first state in which a vehicle moved from a high friction road to a low friction road on the basis of the predicted wheel slip value (yn) calculated by the calculator 104.

At this point, the high friction road may be a dry road and the dry road may be an asphalt road, and the low friction road may be a wet road and the wet road may be a road on which at least one of rain, snow and ice is present.

Further, when the current state is determined as being the first state, the determiner 106 compares the predicted wheel slip value (yn) calculated by the calculator 104 with a predetermined target slip prediction value range, and determines, under the control of the controller 108, whether to control an operation state of the EPB apparatus 30 of which one state among an apply state, a stop state, and a release state.

For example, as shown in FIGS. 2 to 4, the determiner 106 may, under the control of the controller 108, determine whether the current state is a second state (0 to VS1) in which the predicted wheel slip value (yn) calculated by the calculator 104 is less than a first predicted target slip value range VS1 of first and second predicted target slip value ranges VS1 and VS2.

As another example, the determiner 106 may, under the control of the controller 108, determine whether the current state is a third state (VS1 to VS2) in which the predicted wheel slip value (yn) calculated by the calculator 104 is greater than the first predicted target slip value range VS1 of the first and second predicted target slip value ranges VS1 and VS2, and is less than the second predicted target slip value range VS2 of the first and second predicted target slip value ranges VS1 and VS2.

As still another example, the determiner 106 may, under the control of the controller 108, determine whether the current state is a fourth state (over VS2) in which the predicted wheel slip value (yn) calculated by the calculator 104 is greater than the second predicted target slip value range VS2 of the first and second predicted target slip value ranges VS1 and VS2.

When the current state is determined as being the first state in the determiner 106, the controller 108 transmits at least one command among an apply command corresponding to the apply state, a stop command corresponding to the stop state, and a release command corresponding to the release state to the EPB apparatus 30.

In other words, when the current state is determined as being the first state, the controller 108 may transmit in advance at least one command among the apply command corresponding to the apply state, the stop command corresponding to the stop state, and the release command corresponding to the release state to the EPB apparatus 30 using a predicted wheel slip value (yn) calculated by the calculator 104 after the time t.

For example, as shown in FIGS. 2 to 4, when the determiner 106 determines the current state as being the first state and the second state (0 to VS2) in which the predicted wheel slip value (yn) calculated by the calculator 104 is less than the first predicted target slip value range VS1 of the first and second predicted target slip value ranges VS1 and VS2 which are set in the determiner 106, the controller 108 may transmit the apply command corresponding to the apply state to the EPB apparatus 30.

As another example, when the determiner 106 determines the current state as being the first state and the third state (VS1 to VS2) in which the predicted wheel slip value (yn) calculated by the calculator 104 is greater than the first predicted target slip value range VS1 of the first and second predicted target slip value ranges VS1 and VS2, which are set in the determiner 106, and is less than the second predicted target slip value range VS2 of the first and second predicted target slip value ranges VS1 and VS2, the controller 108 may transmit the stop command corresponding to the stop state to the EPB apparatus 30.

As still another example, when the determiner 106 determines the current state as being the first state and the fourth state in which the predicted wheel slip value (yn) calculated by the calculator 104 is greater than the second predicted target slip value range VS2 of the first and second predicted target slip value ranges VS1 and VS2 which are set in the determiner 106, the controller 108 may transmit the release command corresponding to the release state to the EPB apparatus 30.

At this point, it can be seen that deceleration of a vehicle at vehicle speed values (RL': a speed value of a rear left wheel, and RR': a speed value of a rear right wheel) using slip prediction model information is more rapidly performed than deceleration of the vehicle at vehicle speed values (RL: a speed value of the rear left wheel, and RR: a speed value of the rear right wheel) using the conventional slip information when a brake signal BS is applied to the EPB apparatus 30 as shown in FIG. 5.

Further, the inputter 102 of the vehicle control apparatus 100 according to one embodiment of the present disclosure may further receive a vehicle speed value sensed by the sensing apparatus 10, and the determiner 106 may, under the control of the controller 108, further determine whether the vehicle is in the stop state on the basis of the vehicle speed value input to the inputter 102.

At this point, when the vehicle is determined as being in the stop state in the determiner 106, the controller 108 may further transmit an OFF command to the EPB apparatus 30 to turn off the EPB apparatus 30.

Here, the determiner 106 may, under the control of the controller 108, determine whether the vehicle speed value input to the inputter 102 is 0 when determining whether the vehicle is in the stop state.

At this point, although not shown in the drawings, the sensing apparatus 10 may include a vehicle speed sensing sensor (not shown) configured to sense a vehicle speed value.

A vehicle control method using the vehicle control apparatus 100 according to one embodiment of the present disclosure will be described with reference to FIGS. 6 and 7.

Figure 6:
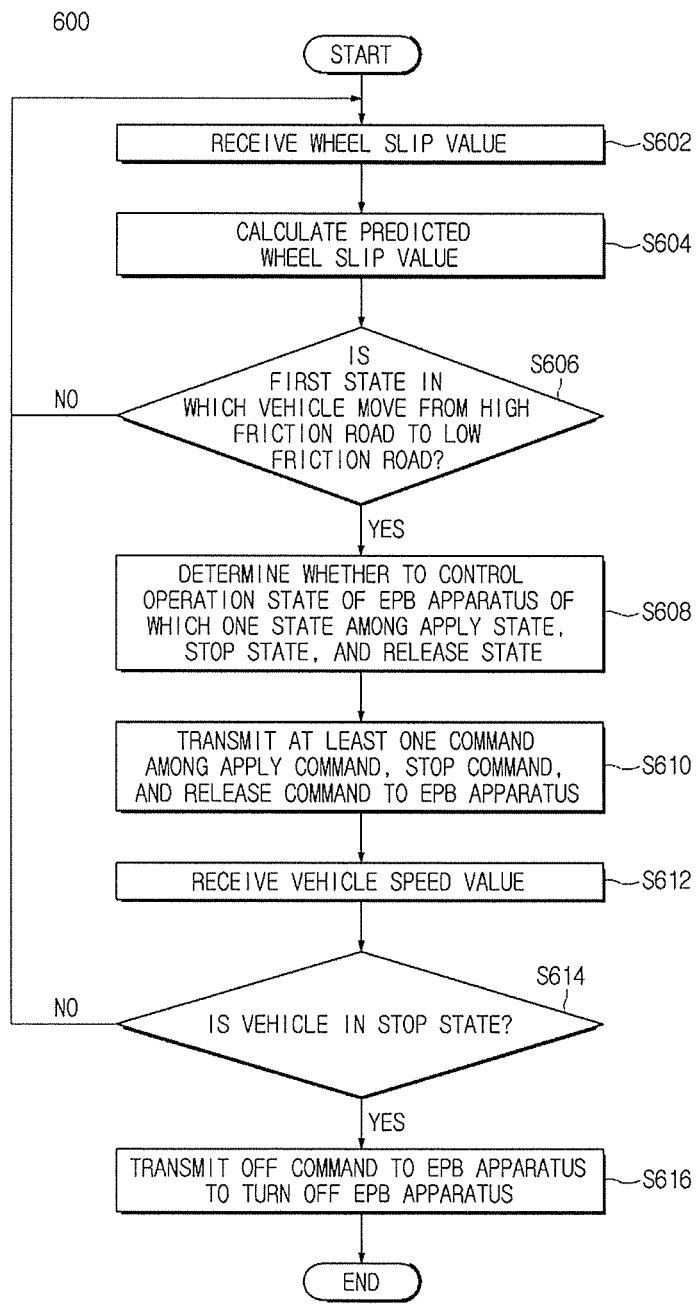
FIG. 6 is a flowchart illustrating one example of a vehicle control method of a vehicle control apparatus according to one embodiment of the present disclosure.
Figure 7:
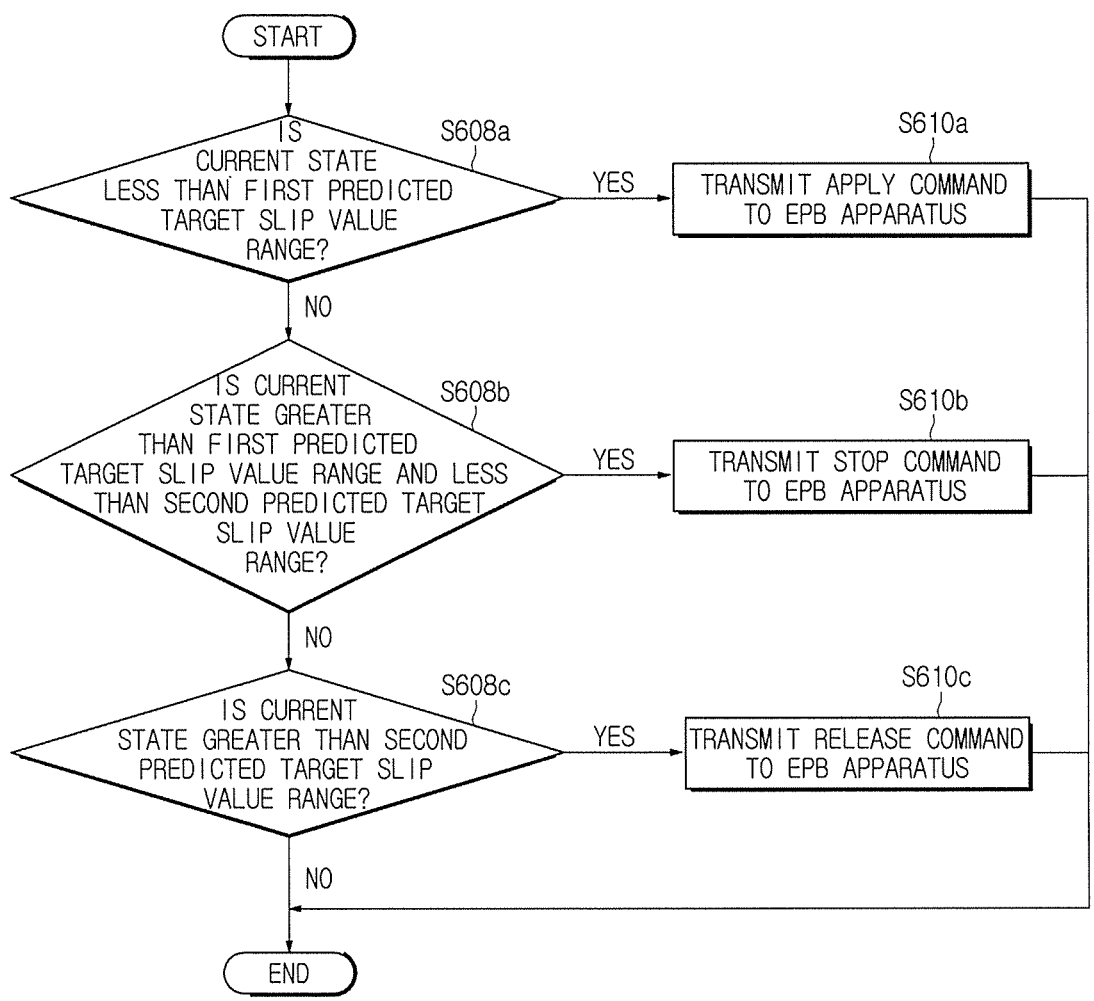
FIG. 7 is a flowchart illustrating examples of a second determination operation and a first control operation which are shown in FIG. 6.

FIG. 6 is a flowchart illustrating one example of a vehicle control method of a vehicle control apparatus according to one embodiment of the present disclosure, and FIG. 7 is a flowchart illustrating examples of a second determination operation and a first control operation which are shown in FIG. 6.

Referring to FIG. 6, a vehicle control method 600 of the vehicle control apparatus 100 of FIG. 2 according to one embodiment of the present disclosure includes a first input operation 602, a calculation operation 604, a first determination operation 606, a second determination operation 608, and a first control operation 610.

First, in the first input operation 602, the inputter 102 of FIG. 1 receives wheel slip values sensed by the sensing apparatus 10 of FIG. 2.

Then, in the calculation operation 604, the calculator 104 of FIG. 2 receives the wheel slip values input to the inputter 102 of FIG. 2, and, under the control of the controller 108 of FIG. 2, calculates a predicted wheel slip value (yn) in FIG. 3 using slip prediction model information on the basis of a previous wheel slip value (y0) in FIG. 3 and a current wheel slip value (y) in FIG. 3 among the wheel slip values.

For example, in calculation operation 604, the calculator 104 of FIG. 2 may, under the control of the controller 108 of FIG. 2, calculate the previous wheel slip value (y0) in FIG. 3 and the current wheel slip value (y) in FIG. 3 during a certain period of time (from a time t0 to a time t in FIG. 3) (S1 in FIG. 3), and the calculator 104 of FIG. 2 may, under the control of the controller 108 of FIG. 2, calculate the predicted wheel slip value (yn) in FIG. 3 on the basis of the previous wheel slip value (y0) in FIG. 3 and the current wheel slip value (y) in FIG. 3 during an upcoming period of time (from the time t to a time to in FIG. 3) (S2 in FIG. 3).

Thereafter, in the first determination operation 606, the determiner 106 of FIG. 2 determines, under the control of the controller 108 of FIG. 2, whether a current state is a first state in which a vehicle moved from a high friction road to a low friction road on the basis of the predicted wheel slip value (yn) of FIG. 3 calculated by the calculator 104 of FIG. 2.

Subsequently, in the second determination operation 608, when the current state is determined as being the first state in the determiner 106 of FIG. 2, the determiner 106 of FIG. 2 compares, under the control of the controller 108 of FIG. 2, the predicted wheel slip value (yn) in FIG. 3 calculated by the calculator 104 of FIG. 2 with a predicted target slip value range, which is set in the determiner 106 of FIG. 2, to determine whether to control an operation state of the EPB device 30 of FIG. 2 of which one state among an apply state, a stop state, and a release state.

For example, as shown in FIG. 7, in a second determination operation 608a, the determiner 106 of FIG. 2 may, under the control of the controller 108 of FIG. 2, determine whether the current state is a second state (0 to VS1) in FIG. 4 in which the predicted wheel slip value (yn) in FIG. 3 calculated by the calculator 104 of FIG. 2 is less than a first predicted target slip value range VS1 in FIG. 4 of first and second predicted target slip value ranges VS1 and VS2 in FIG. 4.

As another example, in a second determination operation S608b, the determiner 106 of FIG. 2 may, under the control of the controller 108 of FIG. 2, determine whether the current state is a third state (VS1 to VS2) in FIG. 4 in which the predicted wheel slip value (yn) in FIG. 3 calculated by the calculator 104 of FIG. 2 is greater than the first predicted target slip value range VS1 in FIG. 4 of the first and second predicted target slip value ranges VS1 and VS2 in FIG. 4, and is less than the second predicted target slip value range VS2 in FIG. 4 of the first and second predicted target slip value ranges VS1 and VS2 in FIG. 4.

As still another example, in a second determination operation 608c, the determiner 106 of FIG. 2 may, under the control of the controller 108 of FIG. 2, determine whether the current state is a fourth state (over VS2) in FIG. 4 in which the predicted wheel slip value (yn) in FIG. 3 calculated by the calculator 104 of FIG. 2 is greater than the second predicted target slip value range VS2 in FIG. 4 of the first and second predicted target slip value ranges VS1 and VS2 in FIG. 4.

Then, when the current state is determined as being the first state in the determiner 106 of FIG. 2, in the first control operation 610, the controller 108 of FIG. 2 transmits at least one command among an apply command corresponding to the apply state, a stop command corresponding to the stop state, and a release command corresponding to the release state to the EPB apparatus 30 of FIG. 2.

For example, as shown in FIGS. 6 and 7, when the determiner 106 of FIG. 2 determines the current state as being the first state in the first determination operation 606, and, in the second determination operation 608a, determines the current state as being the second state (0 to VS1) in FIG. 4 in which the predicted wheel slip value (yn) in FIG. 3 calculated by the calculator 104 of FIG. 2 is less than the first predicted target slip value range VS1 in FIG. 4 of the first and second predicted target slip value ranges VS1 and VS2 in FIG. 4, the controller 108 of FIG. 2 may, in a first control operation 610a, transmit the apply command corresponding to the apply state to the EPB apparatus 30 of FIG. 2.

As another example, when the determiner 106 of FIG. 2 determines the current state as being the first state in the first determination operation 606, and, in the second determination operation S608b, determines the current state as being the third state (VS1 to VS2) in FIG. 4 in which the predicted wheel slip value (yn) in FIG. 3 calculated by the calculator 104 of FIG. 2 is greater than the first predicted target slip value range VS1 in FIG. 4 of the first and second predicted target slip value ranges VS1 and VS2 in FIG. 4, and is less than the second predicted target slip value range VS2 in FIG. 4 of the first and second predicted target slip value ranges VS1 and VS2 in FIG. 4, the controller 108 of FIG. 2 may, in a first control operation 610b, transmit the stop command corresponding to the stop state to the EPB apparatus 30 of FIG. 2.

As still another example, when the determiner 106 of FIG. 2 determines the current state as being the first state in the first determination operation 606, and, in the second determination operation 608b, determines the current state as being the fourth state (over VS2) in FIG. 4 in which the predicted wheel slip value (yn) in FIG. 3 calculated by the calculator 104 of FIG. 2 is greater than the second predicted target slip value range VS2 in FIG. 4 of the first and second predicted target slip value ranges VS1 and VS2 in FIG. 4, the controller 108 of FIG. 2 may, in a first control operation 610c, transmit the release command corresponding to the release state to the EPB apparatus 30 of FIG. 2.

The vehicle control method 600 of the vehicle control apparatus 100 of FIG. 2 according to one embodiment of the present disclosure may further include a second input operation 612, a third determination operation 614, and a second control operation 616.

First, in the second input operation 612, the inputter 10 of FIG. 2 may further receive the vehicle speed value sensed by the sensing apparatus 10 of FIG. 2.

Thereafter, in the third determination operation 614, the determiner 106 of FIG. 2 may, under the control of the controller 108 of FIG. 2, further determine whether the vehicle is in the stop state on the basis of the vehicle speed value input to the inputter 102 of FIG. 2.

Here, when the determiner 106 of FIG. 2 determines whether the vehicle is in the stop state, in the third determination operation 614, the determiner 106 of FIG. 2 may, under the control of the controller 108 of FIG. 2, determine whether the vehicle speed value input to the inputter 102 of FIG. 2 is 0.

Subsequently, when the vehicle is determined as being in the stop state in the determiner 106 of FIG. 2, in the second control operation 616, the controller 108 of FIG. 2 may further transmit an OFF command to the EPB apparatus 30 of FIG. 2 to turn off the EPB apparatus 30 of FIG. 2.

Figure 8:
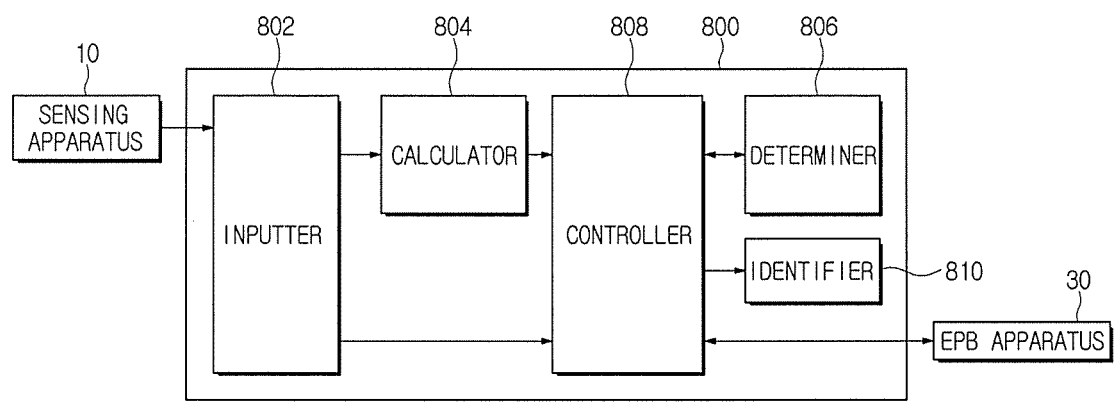
FIG. 8 is a block configuration diagram illustrating another example of the vehicle control apparatus according to one embodiment of the present disclosure.

FIG. 8 is a block configuration diagram illustrating another example of the vehicle control apparatus according to one embodiment of the present disclosure.

Referring to FIG. 8, like the vehicle control apparatus 100 of FIG. 2, a vehicle control apparatus 800 according to one embodiment of the present disclosure includes an inputter 802, a calculator 804, a determiner 806, and a controller 808.

Functions of components of the vehicle control apparatus 800 according to one embodiment of the present disclosure and a systematic connection relationship between the components thereof are the same as the functions of the components of the vehicle control apparatus 100 of FIG. 2 and the systematic connection relationship between the components thereof, so additional descriptions thereof will be omitted below.

Here, the vehicle control apparatus 800 according to one embodiment of the present disclosure may further include an identifier 810.

At this point, when the current state is determined as being the first state in the determiner 806, the identifier 810 may, under the control of the controller 808, identify a state in which a vehicle moved from a high friction road to a low friction road.

Further, when the current state is determined as being the second state in the determiner 806, the identifier 810 may, under the control of the controller 808, identify a state in which an apply command is currently transmitted to the EPB apparatus 30.

Furthermore, when the current state is determined as being the third state in the determiner 806, the identifier 810 may, under the control of the controller 808, identify a state in which a stop command is currently transmitted to the EPB apparatus 30.

Moreover, when the current state is determined as being the fourth state in the determiner 806, the identifier 810 may, under the control of the controller 808, identify a state in which a release command is currently transmitted to the EPB apparatus 30.

Additionally, when the vehicle is determined as being in the stop state in the determiner 806, the identifier 810 may, under the control of the controller 808, identify a state in which an OFF command is currently transmitted to the EPB apparatus 30.

In addition, when an EPB OFF completion signal is received from the EPB apparatus 30, the identifier 810 may, under the control of the controller 808, identify that the current EPB apparatus 30 has been turned off.

At this point, although not shown in the drawing, the identifier 810 may include at least one among an alarm (not shown), a speaker (not shown), and a light emitting member (not shown) which are provided to allow a driver to identify information or a state of a vehicle, and may, via at least one operation among an alarming operation of the alarm (not shown), a sounding operation of the speaker (not shown), and a light emitting operation of the light emitting member (not shown), allow the driver to identify a state in which the vehicle moved from a high friction road to a low friction road, to identify a state in which the apply command is currently transmitted to the EPB apparatus 30, to identify a state in which the stop command is currently transmitted to the EPB apparatus 30, to identify a state in which the release command is currently transmitted to the EPB apparatus 30, to identify a state in which the OFF command is currently transmitted to the EPB apparatus 30, and to identify that the EPB apparatus 30 has been turned off.

Alternatively, although not shown in the drawing, the identifier 810 may include at least one of a human machine interface (HMI) module (not shown) and a head-up display (HUD) module (not shown) which are installed to interface a user with a machine and allow the driver to identify information or a state of the vehicle, and may, via at least one operation among an HMI message display operation of the HMI module (not shown) and an HUD message display operation of the HUD module (not shown), allow the driver to identify a state in which the vehicle moved from a high friction road to a low friction road, to identify a state in which the apply command is currently transmitted to the EPB apparatus 30, to identify a state in which the stop command is currently transmitted to the EPB apparatus 30, to identify a state in which the release command is currently transmitted to the EPB apparatus 30, to identify a state in which the OFF command is currently transmitted to the EPB apparatus 30, and to identify that the EPB apparatus 30 has been turned off.

A vehicle control method of the vehicle using the vehicle control apparatus 800 according to one embodiment of the present disclosure will be described below with reference to FIGS. 9 to 14.

Figure 9:
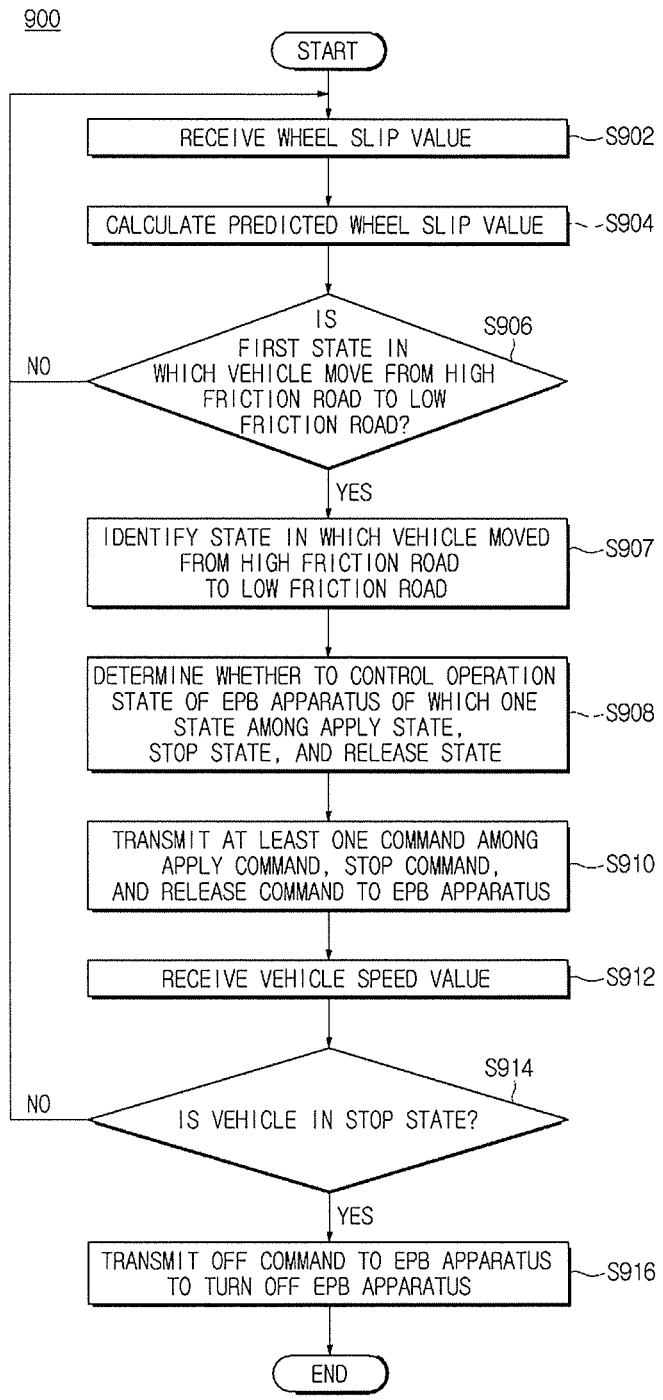
FIG. 9 is a flowchart illustrating another example of the vehicle control method of a vehicle control apparatus according to one embodiment of the present disclosure.
Figure 10:
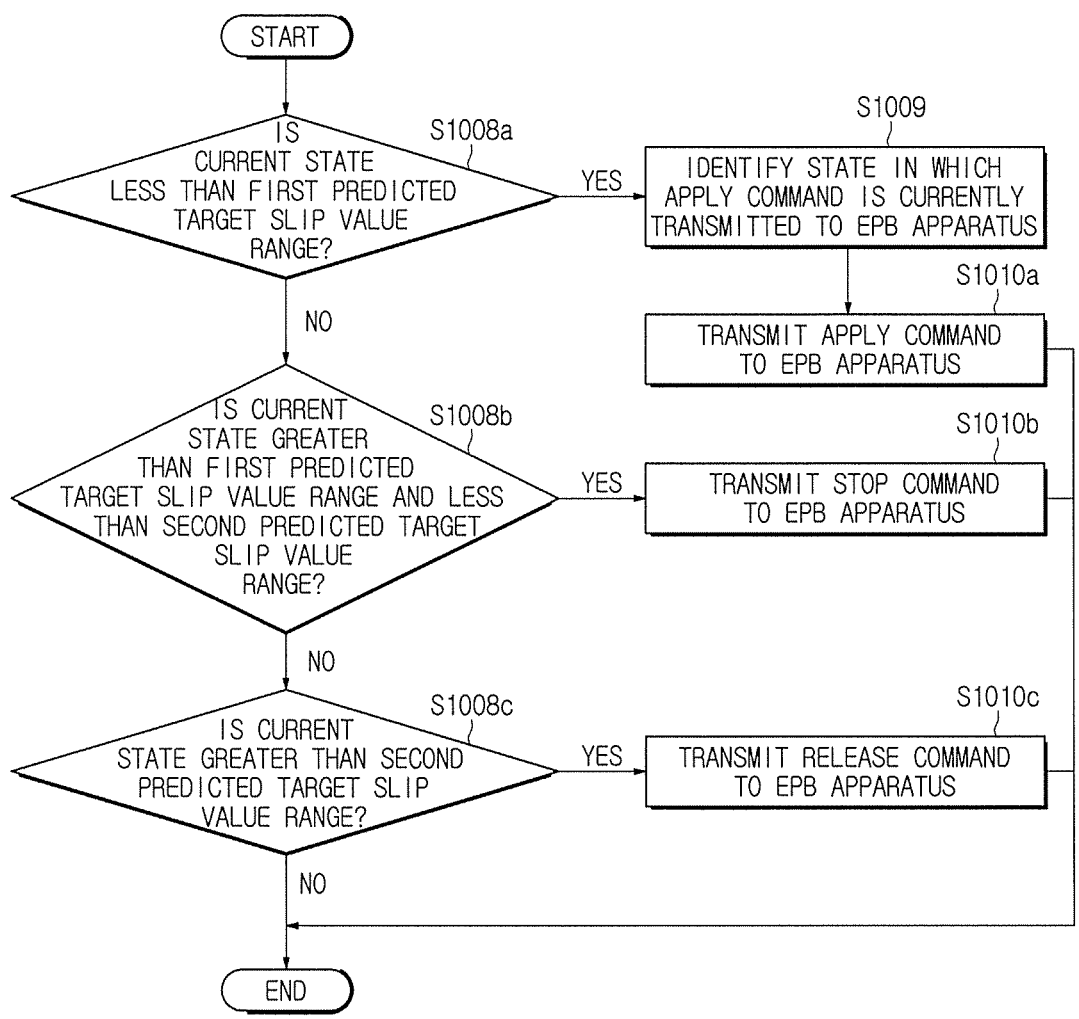
FIG. 10 is a flowchart illustrating still another example of the vehicle control method of a vehicle control apparatus according to one embodiment of the present disclosure.

FIG. 9 is a flowchart illustrating another example of the vehicle control method of the vehicle control apparatus 800 according to one embodiment of the present disclosure, and FIG. 10 is a flowchart illustrating still another example of the vehicle control method of the vehicle control apparatus 800 according to one embodiment of the present disclosure.

Figure 11:
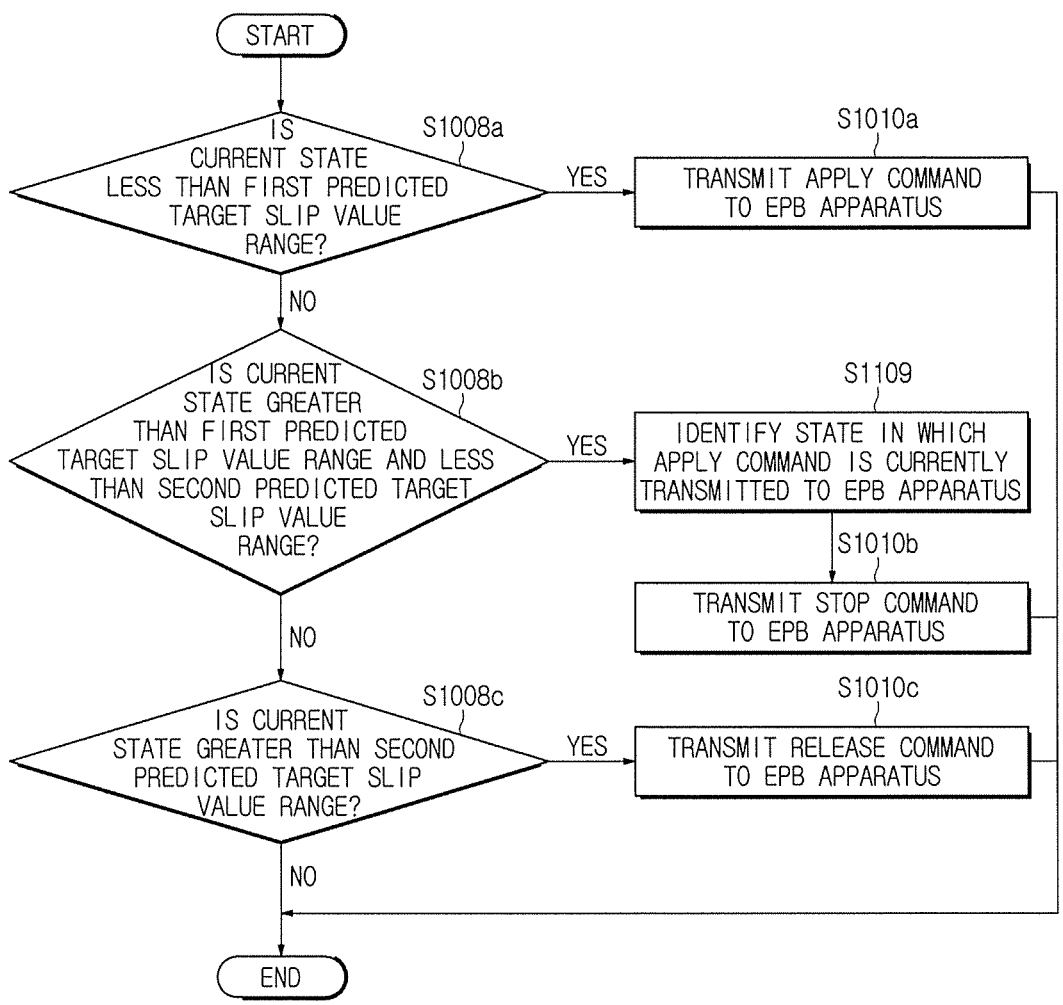
FIG. 11 is a flowchart illustrating yet another example of the vehicle control method of a vehicle control apparatus according to one embodiment of the present disclosure.
Figure 12:
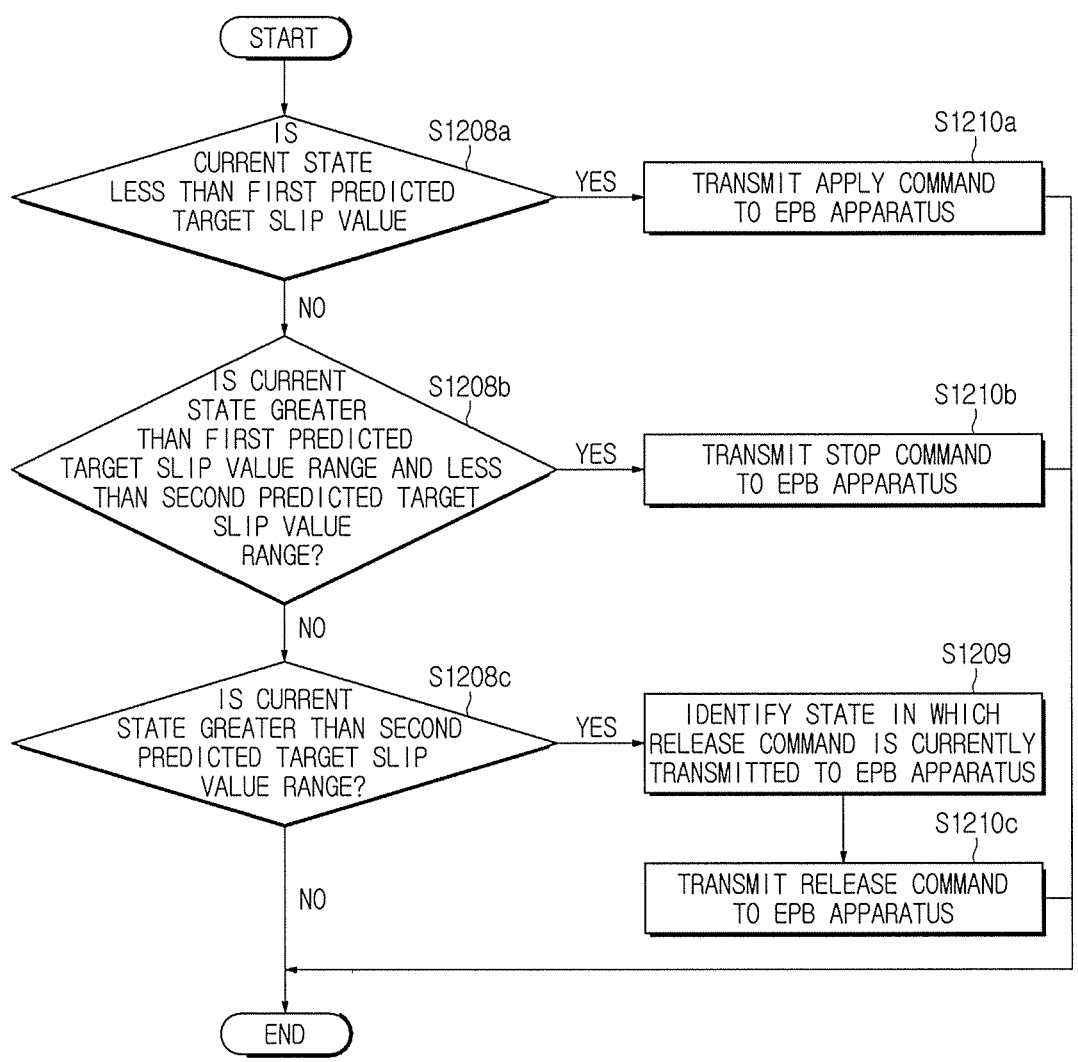
FIG. 12 is a flowchart illustrating yet another example of the vehicle control method of a vehicle control apparatus according to one embodiment of the present disclosure.

FIG. 11 is a flowchart illustrating yet another example of the vehicle control method of the vehicle control apparatus 800 according to one embodiment of the present disclosure, and FIG. 12 is a flowchart illustrating yet another example of the vehicle control method of the vehicle control apparatus 800 according to one embodiment of the present disclosure.

Figure 13:
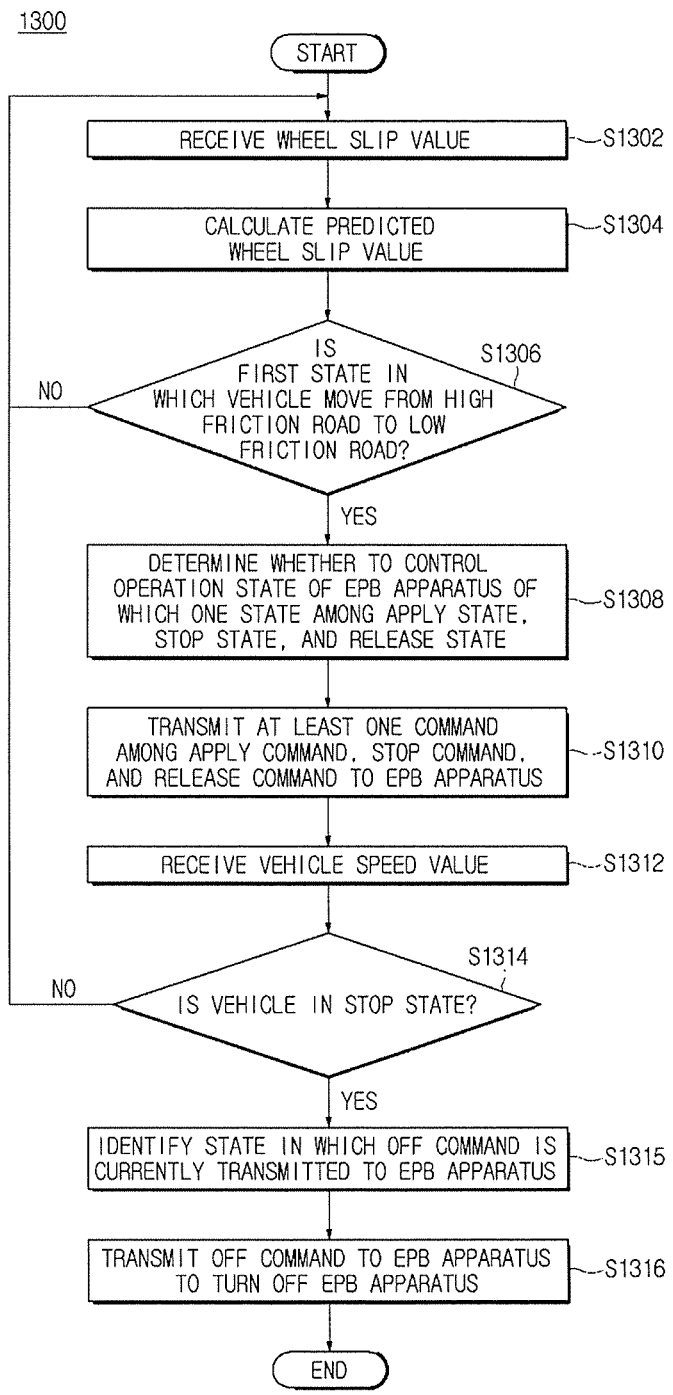
FIG. 13 is a flowchart illustrating yet another example of the vehicle control method of a vehicle control apparatus according to one embodiment of the present disclosure.
Figure 14:
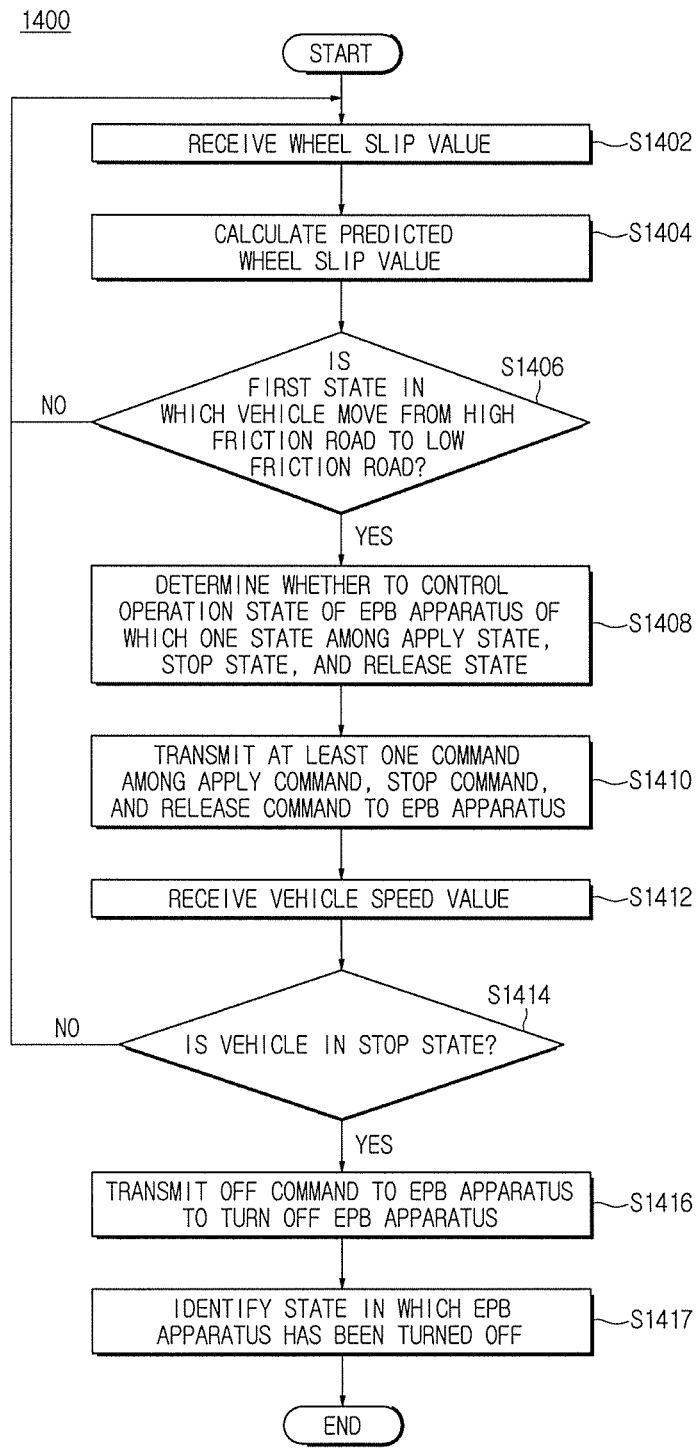
FIG. 14 is a flowchart illustrating yet another example of the vehicle control method of a vehicle control apparatus according to one embodiment of the present disclosure.

FIG. 13 is a flowchart illustrating yet another example of the vehicle control method of the vehicle control apparatus 800 according to one embodiment of the present disclosure, and FIG. 14 is a flowchart illustrating yet another example of the vehicle control method of the vehicle control apparatus 800 according to one embodiment of the present disclosure.

Referring to FIGS. 9 to 14, like the vehicle control method 600 of FIG. 6 of the vehicle control apparatus 100 of FIG. 2, a vehicle control method 900 of the vehicle control apparatus 800 of FIG. 8 according to one embodiment of the present disclosure includes first input operations 902, 1302, and 1402, calculation operations 904, 1304, and 1404, first determination operations 906, 1306, and 1406, second determination operations 908, 1308, 1408, 1008a, 1008b, 1008c, 1108a, 1108b, 1108c, 1208a, 1208b, and 1208c, first control operations 910, 1310, 1410, 1010a, 1010b, S1010c, 1110a, 1110b, 1110c, 1210a, 1210b, and 1210c, second input operations 912, 1312, and 1412, third determination operations 914, 1314, and 1414, and second control operations 916, 1316, and 1416.

Functions of operations of the vehicle control method 900 of the vehicle control apparatus 800 of FIG. 8 according to one embodiment of the present disclosure and a systematic connection relationship between the operations thereof are the same as the functions of the operations of the vehicle control method 600 of FIG. 6 and the operations 608a, 608b, 608c, 610a, 610b, and 610c of FIG. 7 of the vehicle control apparatus 100 of FIG. 2 and the systematic connection relationship between the operations thereof, so additional descriptions thereof will be omitted below.

Here, the vehicle control method 900 of the vehicle control apparatus 800 of FIG. 8 according to one embodiment of the present disclosure may further include a first identification operation 907, a second identification operation 1009, a third identification operation 1109, a fourth identification operation 1209, a fifth identification operation 1315, and a sixth identification operation 1417.

At this point, as shown in FIG. 9, the first identification operation 907 may be performed after the first determination operation 906 and before the second determination operation 908.

As another example, although not shown in the drawings, the first identification operation 907 may be performed in synchronization with the second determination operation 908.

When the current state is determined as being the first state in the determiner 806 of FIG. 8, in the first identification operation 907, the identifier 810 of FIG. 8 may, under the control of the controller 808 of FIG. 8, identify a state in which the vehicle moved from the high friction road to the low friction road.

Further, as shown in FIG. 10, the second identification operation 1009 may be performed after the second determination operation 1008a and before the first control operation 1010a.

As another example, although not shown in the drawings, the second identification operation 1009 may be performed in synchronization with the first control operation 1010a.

When the current state is determined as being the second state in the determiner 806 of FIG. 8, in the second identification operation 1009, the identifier 810 of FIG. 8 may, under the control of the controller 808 of FIG. 8, identify a state in which the apply command is currently transmitted to the EPB apparatus 30 of FIG. 8.

Further, as shown in FIG. 11, the third identification operation 1109 may be performed after the second determination operation 1108b and before the first control operation 1110b.

As another example, although not shown in the drawings, the third identification operation 1109 may be performed in synchronization with the first control operation 1110b.

When the current state is determined as being the third state in the determiner 806 of FIG. 8, in the third identification operation 1109, the identifier 810 of FIG. 8 may, under the control of the controller 808 of FIG. 8, identify a state in which the stop command is currently transmitted to the EPB apparatus 30 of FIG. 8.

Further, as shown in FIG. 12, the fourth identification operation 1209 may be performed after the second determination operation 1208c and before the first control operation 1210c.

As another example, although not shown in the drawings, the fourth identification operation 1209 may be performed in synchronization with the first control operation 1210c.

When the current state is determined as being the fourth state in the determiner 806 of FIG. 8, in the fourth identification operation 1209, the identifier 810 of FIG. 8 may, under the control of the controller 808 of FIG. 8, identify a state in which the release command is currently transmitted to the EPB apparatus 30 of FIG. 8.

Further, as shown in FIG. 13, the fifth identification operation 1315 may be performed after the third determination operation 1314 and before the second control operation 1316.

As another example, although not shown in the drawings, the fifth identification operation 1315 may be performed in synchronization with the second control operation 1316.

When the vehicle is determined as being in the stop state in the determiner 806 of FIG. 8, in the fifth identification operation 1315, the identifier 810 of FIG. 8 may, under the control of the controller 808 of FIG. 8, identify a state in which the OFF command is currently transmitted to the EPB apparatus 30 of FIG. 8.

Further, as shown in FIG. 14, the sixth identification operation 1417 may be performed after the second control operation 1416.

When an EPB OFF completion signal is received from the EPB apparatus 30 of FIG. 8, in the sixth identification operation 1417, the identifier 810 of FIG. 8 may, under the control of the controller 808 of FIG. 8, identify a state in which the EPB apparatus 30 of FIG. 8 has been turned off.

Meanwhile, in order to describe the features of the present disclosure clearly, the vehicle control apparatuses 100 and 800 according to one embodiment of the present disclosure have been described by separating the configurations of the inputters 102 and 802, the calculators 104 and 804, the determiner 106 and 806, and the controllers 108 and 808, and although not shown in the drawings, the inputters 102 and 802, the calculators 104 and 804, the determiner 106 and 806, and the controllers 108 and 808 may be a conventional electronic control unit (ECU) (not shown) or a conventional micro control unit (MCU) (not shown) configured to control an overall operation of a vehicle, determination of a current state of the vehicle, an input of the current state thereof, and calculation of the current state thereof.

Further, the inputters 102 and 802, the calculators 104 and 804, the determiners 106 and 806, and the controllers 108 and 808 are not limited to those described above, and may be any control means capable of controlling the overall operation of the vehicle, any determination means capable of determining a current state of the vehicle, any input means capable of inputting the current state thereof, and any calculation means capable of calculating the current state thereof.

As described above, according to one embodiment of the present disclosure, the vehicle control apparatuses 100 and 800 include the inputters 102 and 802, the calculators 104 and 804, the determiners 106 and 806, and the controllers 108 and 808, and the control methods 600 and 900 of the vehicle control apparatuses 100 and 800 include the first input operations 602, 902, 1302, and 1402, the calculation operations 604, 904, 1304, and 1404, the first determination operations 606, 906, 1306, and 1406, the second determination operations 608, 908, 1308, 1408, 1008a, 1008b, 1008c, 1108a, 1108b, 1108c, 1208a, 1208b, and 1208c, the first control operations 610, 910, 1310, 1410, 1010a, 1010b, 1010c, 1110a, 1110b, 1110c, 1210a, 1210b, and 1210c, the second input operations 612, 912, 1312, and 1412, the third determination operations 614, 914, 1314, and 1414, and the second control operations 616, 916, 1316, and 1416.

Therefore, the vehicle control apparatuses 100 and 800 and the control methods 600 and 900 thereof according to one embodiment of the present disclosure can minimize wheel slip while maximizing deceleration of the vehicle by estimating behavior of wheel slips using slip prediction model information and operating the EPB apparatus 30 efficiently, when the vehicle is traveling from the high friction road to the low friction road.

Further, according to one embodiment of the present disclosure, the vehicle control apparatus 800 further includes the identifier 810 such that the vehicle control method 900 of the vehicle control apparatus 800 can further perform the first identification operation 907, the second identification operation 1009, the third identification operation 1109, the fourth identification operation 1209, the fifth identification operation 1315, and the sixth identification operation 1417.

Accordingly, the vehicle control apparatus 800 and the vehicle control method 900 thereof according to one embodiment of the present disclosure can identify a state in which the vehicle moved from a high friction road to a low friction road, identify a state in which the apply command is currently transmitted to the EPB apparatus 30, identify a state in which the stop command is currently transmitted to the EPB apparatus 30, identify a state in which the release command is currently transmitted to the EPB apparatus 30, identify a state in which the OFF command is currently transmitted to the EPB apparatus 30, and identify that the EPB apparatus 30 has been turned off.

Consequently, the vehicle control apparatus 800 and the vehicle control method 900 thereof according to one embodiment of the present disclosure can recognize a state of a road on which the vehicle is traveling and an operational state of the current EPB apparatus 30 such that cautious driving of a driver can be induced while relieving driver anxiety experienced from a current state of the vehicle.

As is apparent from the above description, the vehicle control apparatus and the control method thereof according to the embodiment of the present disclosure can minimize wheel slip while maximizing deceleration of a vehicle.

Further, the vehicle control apparatus and the control method thereof according to the embodiment of the present disclosure can guide a cautious driving of a driver while relieving driver anxiety experienced with respect to a current state of the vehicle.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle control apparatus comprising:
    an electronic control unit (ECU) configured to:
        receive wheel slip values sensed by a sensing apparatus,
        a calculator configured to receive the wheel slip values and calculate a predicted wheel slip value using slip prediction model information on the basis of a previous wheel slip value and a current wheel slip value among the wheel slip values,
        determine whether a current state is a first state in which a vehicle moved from a high friction road to a low friction road on the basis of the calculated predicted wheel slip value, compare the calculated predicted wheel slip value with predicted target slip value ranges when the current state is determined as being the first state, and determine whether to control an electric parking brake (EPB) apparatus of which one state among an apply state, a stop state, and a release state; and
    a controller configured to transmit at least one command among an apply command corresponding to the apply state, a stop command corresponding to the stop state, and a release command corresponding to the release state to the EPB apparatus when the current state is determined as being the first state.

2. The apparatus of claim 1, wherein the ECU determines whether the current state is a second state in which the calculated predicted wheel slip value is less than a first predicted target slip value range of the predicted target slip value ranges.

3. The apparatus of claim 1, wherein the ECU determines whether the current state is a third state in which the calculated predicted wheel slip value is greater than a first predicted target slip value range of the predicted target slip value ranges and is less than a second predicted target slip value range thereof.

4. The apparatus of claim 1, wherein the ECU determines whether the current state is a fourth state in which the calculated predicted wheel slip value is greater than a second predicted target slip value range of the predicted target slip value ranges.

5. The apparatus of claim 1, wherein, when the current state is determined as being the first state and a second state in which the calculated predicted wheel slip value is less than a first predicted target slip value range of the predicted target slip value ranges, the controller transmits the apply command corresponding to the apply state to the EPB apparatus.

6. The apparatus of claim 1, wherein, when the current state is determined as being the first state and a third state in which the calculated predicted wheel slip value is greater than a first predicted target slip value range of the predicted target slip value ranges and is less than a second predicted target slip value range thereof, the controller transmits the stop command corresponding to the stop state to the EPB apparatus.

7. The apparatus of claim 1, wherein, when the current state is determined as being the first state and a fourth state in which the calculated predicted wheel slip value is greater than a second predicted target slip value range of the predicted target slip value ranges, the controller transmits the release command corresponding to the release state to the EPB apparatus.

8. The apparatus of claim 1, wherein
    the ECU:
        further receives a vehicle speed value sensed by the sensing apparatus,
        further determines whether the vehicle is in the stop state on the basis of the received vehicle speed value; and
    receives the vehicle speed value and further transmits an OFF command to the EPB apparatus to turn off the EPB apparatus when the vehicle is determined as being in the stop state.

9. A vehicle control method comprising:
    receiving wheel slip values sensed by a sensing apparatus;
    receiving the wheel slip values and calculating a predicted wheel slip value using slip prediction model information on the basis of a previous wheel slip value and a current wheel slip value among the wheel slip values;
    determining whether a current state is a first state in which a vehicle moved from a high friction road to a low friction road on the basis of the calculated predicted wheel slip value;
    comparing the calculated predicted wheel slip value with predicted target slip value ranges when the current state is determined as being the first state, and determining whether to control an electric parking brake (EPB) apparatus of which one state among an apply state, a stop state, and a release state; and
    transmitting at least one command among an apply command corresponding to the apply state, a stop command corresponding to the stop state, and a release command corresponding to the release state to the EPB apparatus when the current state is determined as being the first state.

10. The method of claim 9, further comprising determining whether the current state is a second state in which the calculated predicted wheel slip value is less than a first predicted target slip value range of the predicted target slip value ranges.

11. The method of claim 9, further comprising determining whether the current state is a third state in which the calculated predicted wheel slip value is greater than a first predicted target slip value range of the predicted target slip value ranges and is less than a second predicted target slip value range thereof.

12. The method of claim 9, further comprising determining whether the current state is a fourth state in which the calculated predicted wheel slip value is greater than a second predicted target slip value range of the predicted target slip value ranges.

13. The method of claim 9, further comprising transmitting the apply command corresponding to the apply state to the EPB apparatus when the current state is determined as being the first state and a second state in which the calculated predicted wheel slip value is less than a first predicted target slip value range of the predicted target slip value ranges.

14. The method of claim 9, further comprising transmitting the stop command corresponding to the stop state to the EPB apparatus when the current state is determined as being the first state and a third state in which the calculated predicted wheel slip value is greater than a first predicted target slip value range of the predicted target slip value ranges and is less than a second predicted target slip value range thereof.

15. The method of claim 9, further comprising transmitting the release command corresponding to the release state to the EPB apparatus when the current state is determined as being the first state and a fourth state in which the calculated predicted wheel slip value is greater than a second predicted target slip value range of the predicted target slip value ranges.

16. The method of claim 9, further comprising:

receiving a vehicle speed value sensed by the sensing apparatus;

determining whether the vehicle is in the stop state on the basis of the received vehicle speed value; and transmitting an OFF command to the EPB apparatus to turn off the EPB apparatus when the vehicle is determined as being in the stop state.

\* \* \* \* \*